(12) United States Patent
Priest, II

(10) Patent No.: US 6,305,427 B1
(45) Date of Patent: Oct. 23, 2001

(54) DOUBLE WALLED APPARATUS AND METHODS

(75) Inventor: Kenneth G. Priest, II, South China, ME (US)

(73) Assignee: Kenway Corporation, Augusta, ME (US)

(*) Notice: Subject to any disclaimer, the term of this patent is extended or adjusted under 35 U.S.C. 154(b) by 0 days.

(21) Appl. No.: 09/443,440

(22) Filed: Nov. 19, 1999

(51) Int. Cl.$^7$ ........................................... F16L 11/10
(52) U.S. Cl. .......................... 138/125; 138/104; 138/137
(58) Field of Search .................... 138/104, 125, 138/112, 124, 133, 137, 149

(56) References Cited

U.S. PATENT DOCUMENTS

| | | |
|---|---|---|
| H1057 | 5/1992 | Regalia et al. . |
| 3,828,112 | 8/1974 | Johansen et al. . |
| 3,882,382 | 5/1975 | Johnson . |
| 4,215,384 | 7/1980 | Elson . |
| 4,216,821 | 8/1980 | Robin . |
| 4,421,698 | 12/1983 | Vanderlans . |
| 4,487,057 | 12/1984 | Lutz . |
| 4,534,662 | 8/1985 | Barlian . |
| 4,554,650 | 11/1985 | Brown et al. . |
| 4,671,675 | 6/1987 | Arisi et al. . |
| 4,682,849 | 7/1987 | Kowata et al. . |
| 4,754,136 | 6/1988 | Blakely . |
| 4,797,621 | 1/1989 | Anderson et al. . |
| 4,817,817 | 4/1989 | Palazzo . |
| 4,844,287 | 7/1989 | Long . |
| 4,850,672 | 7/1989 | Zimmermann . |
| 4,922,232 | 5/1990 | Bosich . |
| 4,974,739 | 12/1990 | Gelin . |
| 4,989,447 | 2/1991 | Gelin . |
| 5,010,440 | 4/1991 | Endo . |
| 5,172,730 | 12/1992 | Driver . |
| 5,176,025 | 1/1993 | Butts . |
| 5,305,798 | 4/1994 | Driver . |
| 5,306,088 | 4/1994 | Zoerner . |
| 5,309,540 | 5/1994 | Turpin et al. . |
| 5,546,992 | 8/1996 | Chick et al. . |
| 5,551,484 | 9/1996 | Charboneau . |
| 5,688,222 | 11/1997 | Huchy et al. . |
| 5,778,938 | 7/1998 | Chick et al. . |
| 5,806,528 | 9/1998 | Magliochetti . |
| 5,817,926 | 10/1998 | Brandes . |
| 5,908,049 | 6/1999 | Williams et al. . |
| 5,913,337 | 6/1999 | Williams et al. . |
| 5,918,267 | 6/1999 | Evans et al. . |
| 5,927,342 | 7/1999 | Bogut et al. . |
| 6,158,476 | * 12/2000 | Sjotun .................................. 138/126 |
| 6,230,751 | * 5/2001 | Sjotun .................................. 138/153 |

* cited by examiner

*Primary Examiner*—James Hook
(74) *Attorney, Agent, or Firm*—Howrey Simon Arnold & White; Michael J. Bell

(57) ABSTRACT

The present invention relates to an apparatus and method for handling liquids or gases. In particular, the present invention relates to a double walled apparatus having interwoven fibers between the inner and outer walls of the pipe. The invention may also include sensors in the apparatus. The apparatus comprises a first wall designed to contain a liquid or a gas, a second wall designed to contain any liquid or gas that penetrates the first wall, and interwoven fibers coupled between the first and second wall. The interwoven fibers are preferably resin laminated fibers in a matrix configuration. The apparatus may also comprises a sensor and a wire embedded in the apparatus either in the first wall, the interwoven fibers, or the second wall. The first wall is preferably comprised of three layers that are cohesively bonded together. The invention further provides a method for manufacturing such apparatuses, a network of such apparatuses, and a system and method for monitoring conditions in such apparatuses and the location of the apparatuses and sensors within the network.

25 Claims, 5 Drawing Sheets

DOUBLE WALLED APPARATUS AND METHODS

BACKGROUND OF THE INVENTION

1. Field of the Invention

The present invention relates to an apparatus and method for handling liquids or gases. In particular, the present invention relates to a double walled apparatus employing sensors and methods related thereto.

2. Related Art

Double walled tanks and pipes are commonly used in industry. The pipes typically comprise an inner wall and an outer wall separated by some annular space. The outer wall is generally designed to maintain the integrity of the pipe in the event of failure of the inner wall. The separation of the outer wall and inner wall is typically maintained by rings or spacers disposed between the two walls at various intervals along the length of the pipe or tank. By using such spacers or rings, there are areas along the pipe between spacers that are more susceptible to damage than those areas where the spacers are located. Since there is nothing between the inner and outer walls to prevent the collapse of the outer wall in these areas, it is possible that if the outer wall were subject to extreme external pressures it could easily collapse.

Pipes have been developed with wires maintained within the space between the walls of the pipe to detect the presence of liquid. This is done to overcome the need to visually inspect pipes and tanks on a regular basis. However, such systems report nothing more to an inspector than when liquid is present outside the inner wall of the pipe. There is presently no system that reports the constant conditions of the pipe or tank prior to failure of the inner wall. Typically, pipes and tanks having a double walled construction are buried in the ground, encased in concrete, or are in remote areas. When they are situated in such a manner, the pipe is virtually inaccessible for inspection or repair. It is possible to dig around the pipes to inspect them, but such undertakings are often very costly and do not reveal if there is a leak in the inner pipe. Additionally, digging around a pipe or tank could easily damage the pipe or tank. As a result, today the inner wall of a double walled pipe must be drained and some sort of robotic camera deployed to evaluate its structural integrity or locate any leaks.

Thus, there is a need in the art for a double walled apparatus that has a more secure and continuous construction for separating the inner and outer walls of the apparatus. There is further a need for a double walled apparatus employing sensors for providing data about the material conditions of the apparatus on a regular basis. There is further a need for a double walled apparatus that may be inspected or continuously monitored without visual inspection.

SUMMARY OF THE INVENTIONS

The present invention solves the problems with, and overcomes the disadvantages of conventional double walled apparatuses.

The present invention relates to an apparatus and method for handling liquids or gases. In particular, the present invention relates to a double walled apparatus employing sensors and methods related thereto. The apparatus comprises a first wall designed to contain a liquid or a gas, a second wall designed to contain any liquid or gas that penetrates the first wall, and fibers coupled between the first and second wall. The fibers are preferably resin laminated fibers that are interwoven in a matrix configuration. The apparatus further comprises a sensor and a wire or cable embedded in the apparatus either in the first wall, the interwoven fibers, or the second wall. The first wall is preferably comprised of three layers that are cohesively bonded together. The wire could be embedded in a different layer than the sensors as well.

The double walled apparatus could also be used in a network of pipes and tanks. In a network, at least one of the pipes or tanks comprises a double walled apparatus as discussed above. The apparatuses in the network are interconnected such that the wires and sensors are in electrical or optical communication with one another.

A related invention is a method of manufacturing the double walled apparatus discussed above. The method comprises first applying a release agent to a mandrel. The method further comprises forming a first wall on the mandrel. After the first wall is formed, the method includes wrapping an interwoven fiber material around the first wall, and forming a second wall around the interwoven fiber material. The method further includes installing a wire in either the first wall, the second wall, or the interwoven fiber and coupling a sensor to the wire.

In another embodiment of the invention, a system for monitoring conditions within an apparatus is provided. The system comprises a processor for receiving data values from a sensor within a double walled apparatus, wherein the sensor monitors conditions within the apparatus. The processor processes the received data into a desired format. The processor may also initiate an alarm when the data value falls outside a predetermined range. The processor may further initiate an alarm when the data value equals a predetermined value.

In another aspect of the invention, a method for monitoring conditions within an apparatus is provided. The method comprises receiving data from a sensor within a double walled apparatus having interwoven fiber material between the two walls of the apparatus; processing the data to identify whether the data is outside predetermined tolerances; formatting the data; storing the data in memory; and generating reports from the data.

The present invention further provides a computer program product comprising a computer useable medium having computer program logic recorded thereon for enabling a processor in a computer system to display data for visualization and interpretation by a user, wherein the data represents attributes of conditions within the apparatus. The computer program product comprises receiving means for enabling the processor to receive data from a sensor within a double walled apparatus having interwoven fiber material between the two walls of the apparatus. There is a processing means for processing the data to identify whether the data is outside predetermined tolerances. Further, there is a formatting means for formatting the data; a storing means for storing the data in memory; and a generating means for generating reports from the data.

BRIEF DESCRIPTION OF THE DRAWIGNS

The accompanying drawings, which are incorporated in and constitute a part of this specification, illustrate embodiments of the invention and, together with the description, serve to explain the features, advantages, and principles of the invention.

DETAILED DESCRIPTION OF THE PREFERRED EMBODIMENTS

Reference will now be made in detail to the present preferred embodiments of the invention, examples of which are illustrated in the accompanying drawings. The exemplary embodiment of this invention is shown in some detail, although it will be apparent to those skilled in the relevant art that some features which are not relevant to the invention may not be shown for the sake of clarity.

Figure 1:
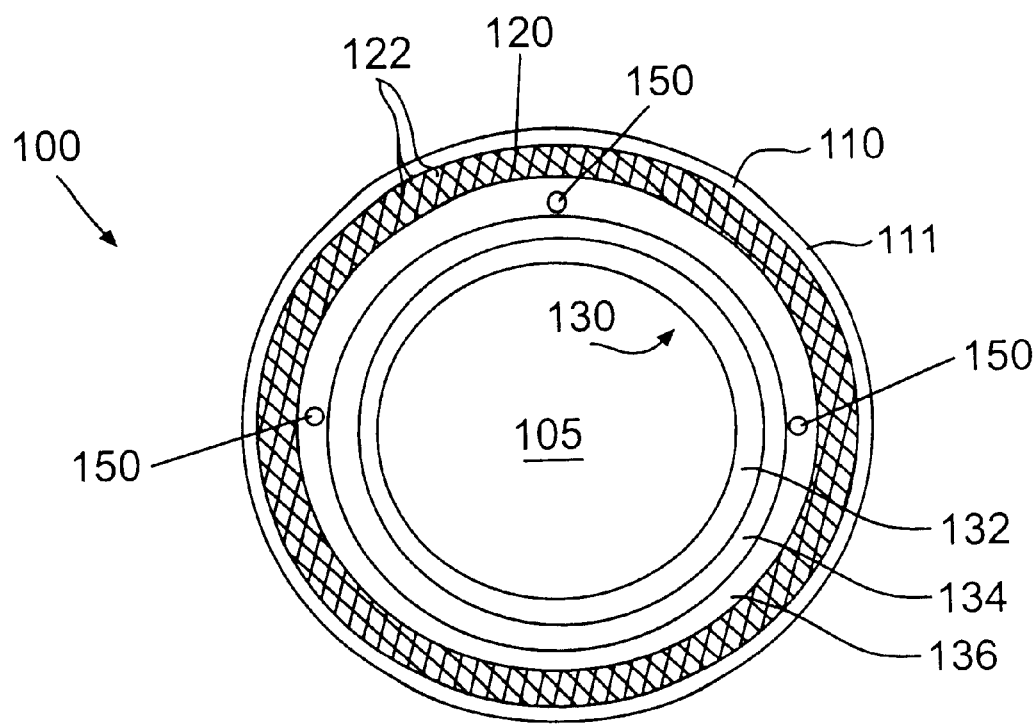
FIG. 1 is a cross sectional view of the apparatus of the present invention.
Figure 2:
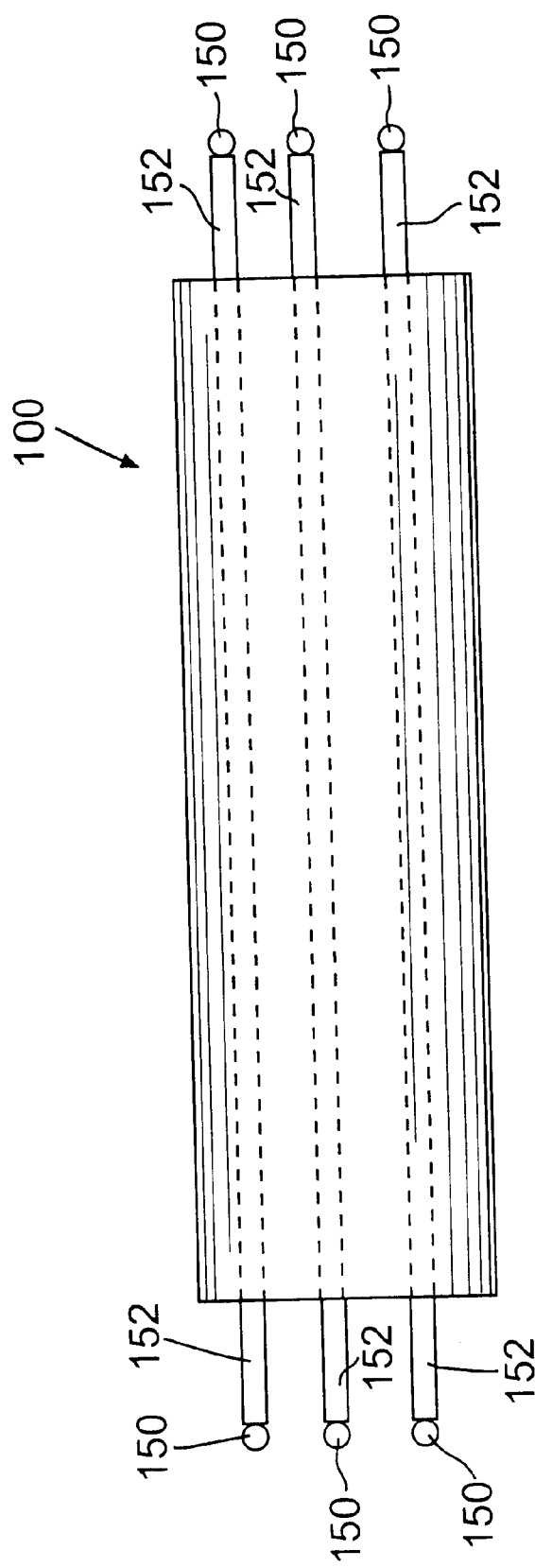
FIG. 2 is a side elevation of the apparatus shown in FIG. 1.

Referring first to FIGS. 1 and 2, there is illustrated an exemplary embodiment of the apparatus 100 of the present invention. While the figures depict the apparatus 100 as a double walled pipe, the apparatus 100 of the present invention includes double walled tanks as well. The apparatus 100 comprises a first wall 130 that is designed to contain a liquid or a gas. The first wall 130 is essentially the inner wall of the double walled apparatus 100 and defines a channel 105 through which liquid or gas is contained or flows. The second wall 110, or outer wall, is designed to contain any liquid that penetrates the first wall. There are fibers 122 coupled between the first wall 130 and the second wall 110. The fibers 122 are preferably interwoven fibers 122 that are laminated with resin to provide stiffness to the fibers 122. The interwoven configuration of the fibers 122 creates a matrix that defines a plurality of channels 120 along the length of the pipe between the first wall 130 and second wall 110 for gas or liquid to flow through. The interwoven fibers 122 are cohesively bonded between the first wall 130 and second wall 110 such that the first wall 130 and second wall 110 and the interwoven fibers 122 are substantially inseparable.

The apparatus 100 further includes a wire 152 threaded in or embedded in the apparatus 100. The wire 152 is preferably a fiber optic cable, but may also include any type of cable, a transmission line, an electrical wire or the like. There is a sensor 150 in electrical communication with the wire 152. The sensors 150 may be configured to detect pressure, strain, temperature, flow rate, stress, pH, viscosity, salinity and the like. The wire 152 and the sensors 150 may be embedded in either the first wall 130, the second wall 110, or between the first wall 130 and second wall 110 in the interwoven fibers 122.

The first, or inner, wall 130 preferably comprises three separate layers, a first layer 132, a second layer 134, and a third layer 136. The inner, or first wall 130 may be constructed from a variety of materials such as glass, PVC, cPVC, Teflon, steel, and fiberglass. Note that the fibers 122 utilized in the present preferred embodiment may comprise one or more of the following: carbon, kevalr™, aramid, nylon, and natural fibers such as hemp. The first layer 132, or inner surface layer, is the layer of the apparatus 100 that comes in contact with the liquid or gas being contained. The first layer 132 preferably comprises a resin with a layer of veil applied to the resin. Epoxy, corrosion resistant resin, or other forms of binding the fibers together may also be used. It is desirable for the first layer 132 to be smooth to allow for uninhibited fluid flow through the channel 105 of the apparatus 100. The first layer 132 is preferably about 20 mils thick for typical applications. The second layer 134, or inner layer, comprises a plurality of layers of chopped strand fiber and a resin. The third layer 136, or structural layer, comprises a chopped strand fiber mat and woven roving fiber with resin. Filament winding of continuous fibers may also be used.

The second wall 110, or outer wall, may comprise a combination of chopped strand fiber mat, woven roving fiber or continuous fiber. There is a resin applied to the chopped strand fiber mat, woven roving fiber or continuous fiber for bonding the fibers together. The outer surface 111 is preferably manufactured using a non-air-inhibited premium resin with ultraviolet absorbers to minimize ultraviolet degradation. Pigments may also be added to color code the apparatus 100 (e.g., purple for fuel).

Throughout the apparatus 100, the preferred chopped strand fiber is 1-½ ounce chopped strand fiberglass and the preferred woven roving fiber is 24 ounce fiberglass. The preferred sensors 150 and cables 152 for use with the present invention are optical fiber sensors and optical fiber transmission cables such as those manufactured by, and available from, Luna Innovations Incorporated, Blacksburg, Virginia.

Figure 3:
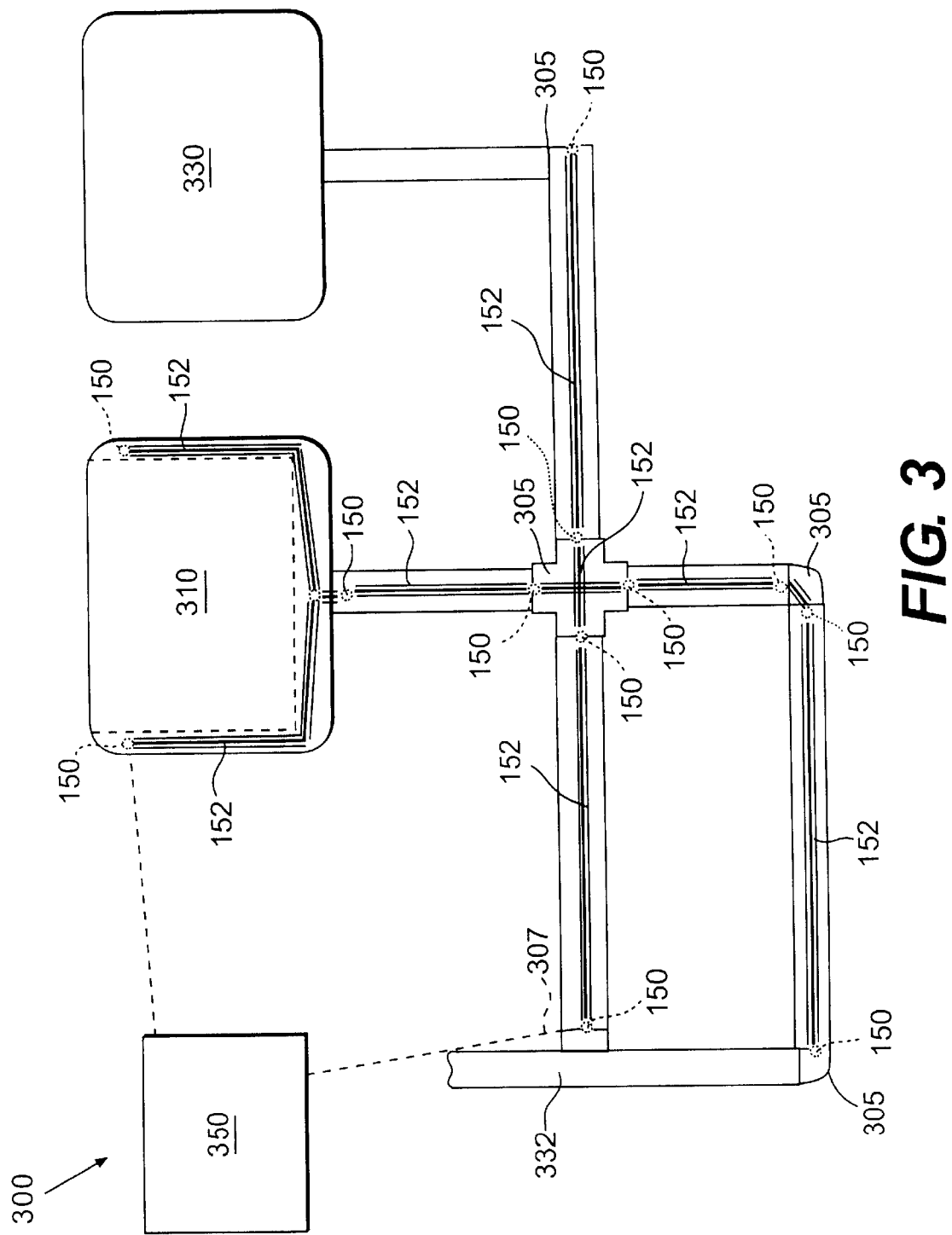
FIG. 3 is a schematic view of a network of apparatuses according to the present invention.

Referring now to FIG. 3, the above described apparatuses 100 may be configured in a network 300 of apparatuses 100. The connections 305 between the apparatuses 100 such as flanges, threads, coupling grooves, or adhesive couplings may be used in a conventional manner. The cables 152 and sensors 150 may be routed around the mechanical connections. The cables 152 may either be continuous through different sections of the apparatus (i.e., different pipe sections) or may be spliced at each section using conventional electrical, or fiber optic, connections.

The apparatus 100 sections may be assembled using butt and wrap joints 307. These joints 307 comprise chopped strand fiber mat and woven roving fiber for the structural connection with the interwoven fibers 122. The sensors 150 at the joints 307 and the cables 152 would be connected and laminated into the interwoven fiber 122 matrix. The outer joint structural connection uses a combination of chopped strand fiber mat and woven roving fiber. Each of the joints 307 is laminated with a resin.

While it is preferable for every apparatus 100 in the network 300 to include the elements described above it is desirable to have at least one apparatus 100 in the network 300 to include the elements of the present invention. For example, tank 330 and pipe 332 are conventional apparatuses while tank 310 is configured as described above. It is also desirable to have various types of apparatuses 100 in one network. For example, a double walled tank, or several tanks, according to the present invention may be coupled to a double walled pipe or pipes according to the present invention. A double walled pipe or double walled tank according to the present invention may also be coupled in a network of conventional double walled pipes and tanks.

In order to monitor the network 300, the network 300 further comprises a receiver 350 in electronic communication with the cable 152 configured to receive data from the sensors 150. The dashed lines in FIG. 3 represent the electronic connection. The connection may either be a direct connection, an infrared connection or a radio communication. The data received may be stored or may simply be used on receipt. For example, the receiver 350 may be configured to initiate an alarm that sounds when the data received is outside a predetermined tolerance or when the data value received is equal to a predetermined value.

Figure 5:
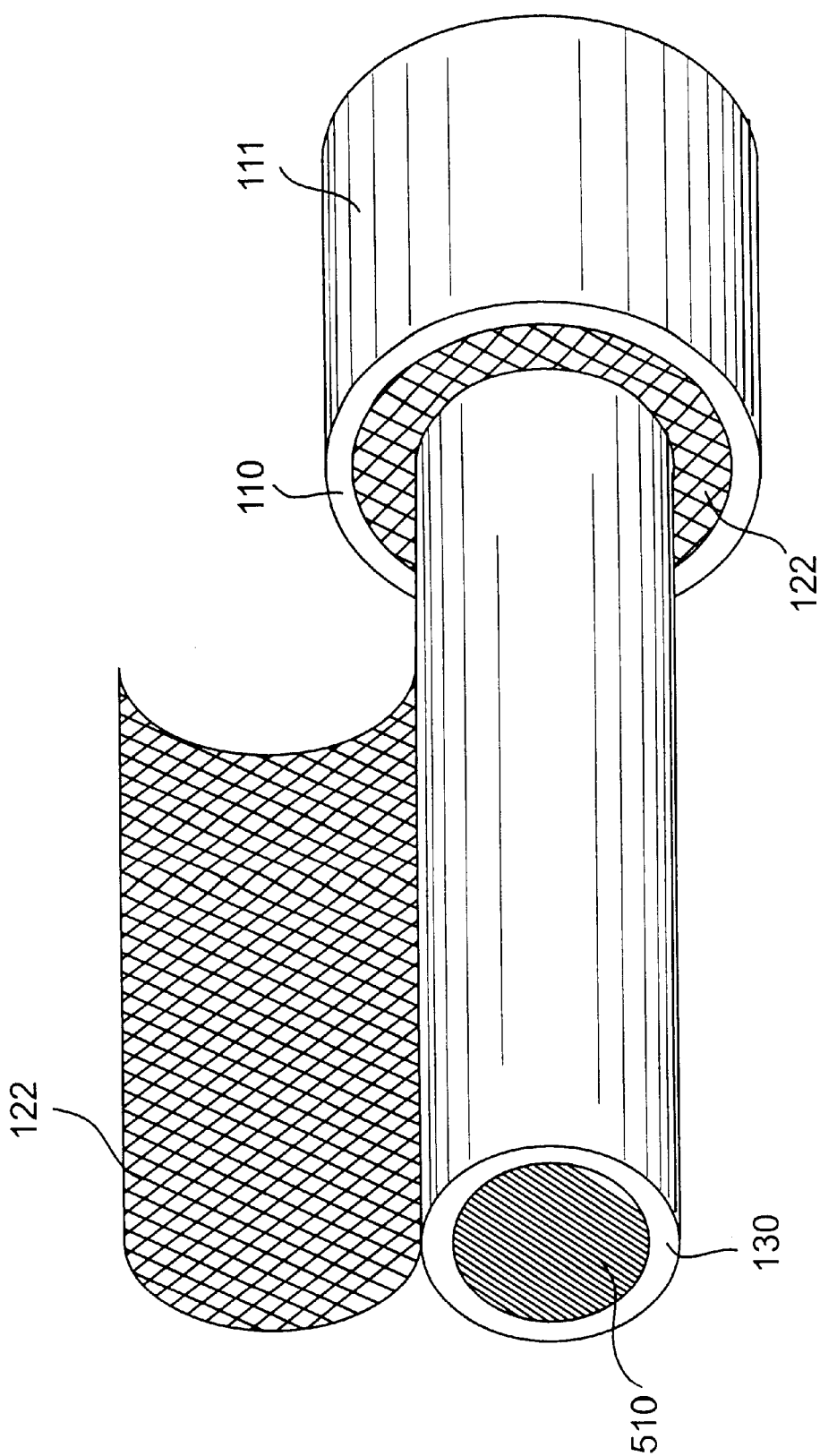
FIG. 5 shows a partially exploded view of an apparatus according to the present invention.

Referring now to FIG. 5, in another embodiment of the present invention, a method of manufacturing an apparatus 100 is provided. The apparatus 100 described above is manufactured by first providing a conventional mandrel 510, such as a steel mandrel, on which to form the apparatus 100. A release agent (not shown) is applied to the mandrel 510. Preferred release agents are PVA or mylar. The first, or inner, wall 130 is then formed on the mandrel. The first wall 130 is formed by forming the first layer 132, the second layer 134 and the third layer 136 of the first wall 130. The first layer 132 is formed by applying resin to the mandrel 510 in a layer that is approximately four to six mils thick. A veil is then applied to the mandrel 510 on top of the resin. The second layer 134 is then formed by applying chopped strand fiber and resin to the mandrel around the first layer 132. The third layer 136 is then formed by applying a chopped strand fiber mat, woven roving fiber or filament winding of continuous fiber and resin to the mandrel surrounding the second layer 134 and first layer 132. Depending upon the desired location of the cables 152 and sensors 150, the cable 150 may be embedded or installed in the first wall 130 during the formation of the first wall 130. A sensor 150 is then coupled to wire 152 during formation of apparatus 100 or at some point after formation of apparatus 100 is completed. It is also possible to embed a sensor 150 in apparatus 100 during manufacture as opposed to after manufacture is completed.

Once the first wall 130 is formed and set, the interwoven fibers 122 are placed around the first wall 130. The interwoven fibers 122 are provided in a continuous flat, flexible sheet that is able to be wrapped around the first wall 130 and then hardened. When the fiber 122 sheet is hardened, the fibers 122 are configured such that they are substantially perpendicular to first wall 130. The cables 152 and sensors 150 may be installed in apparatus 100 during or after the application of the interwoven fibers 122.

Upon completion of wrapping the interwoven fibers 122 around the first wall 130, the second, or outer, wall 110 is formed. The second wall 110 is formed such that upon formation of the second wall 110, the fibers 122 coupled thereto are substantially perpendicular to the second wall 110 as well as the first wall 130. The second wall 110 is formed by applying a combination of chopped strand fiber mat and woven roving fiber or filament winding of continuous fiber. There is a resin applied to the chopped strand fiber mat and woven roving fiber for bonding the fibers together. The outer surface 111 preferably manufactured using a non-air-inhibited resin with ultraviolet absorbers to minimize ultraviolet degradation. Pigments may also be added to color code the apparatus (e.g., purple for fuel). The cables 152 and sensors 150 may be added during the formation of the second wall 110 if so desired.

As noted above, it is desirable to monitor the conditions of the apparatuses 100 of the present invention via a receiver 350 electrically or optically coupled to the sensors 152 and cables 150. In another embodiment of the present invention, a system for monitoring conditions within an apparatus 100 is provided. The system includes a receiver 350 having a processor 404 for receiving data values from a sensor within a double walled apparatus 100. The sensor 150 monitors conditions within the apparatus 100 such as temperature, pressure, viscosity, salinity, moisture, stress, strain, pH, flow rate, etc. The processor 404 then processes the data into the desired format. For example, the data may be compared to predetermined alarm limits and initiate an alarm when the received data value is outside the predetermined limits. The received data value may also be compared to a particular predetermined value and initiate an alarm when the received data value equals the predetermined value. Additionally, the processor 404 may store the data in memory in a database and produce tables of data at selected intervals. The data retrieved may either be printed or displayed on a screen. The stored data may be manipulated to provide reports. For example, all of the temperature data for a selected period may be compiled and analyzed in a single report.

The data that is received may be processed and utilized in a number of different ways. For example, the flow rate at a certain point in a network may be monitored. When the flow rate drops below a certain level, the network may react by causing a valve to be adjusted to increase the flow rate. The processor 404 may also cause other conditions within the network to change such as temperature, pressure, viscosity, salinity, moisture, stress, strain, pH, etc. The data may be utilized by the processor 404 for both passive monitoring of the system as well as active control of the system.

In another aspect of the invention, a method for monitoring conditions within an apparatus 100 is provided. The method comprises receiving data from a sensor 150 within a double walled apparatus 100, processing the data to identify whether the data is outside predetermined tolerances, determining the location of the sensor 150 within a network 300, formatting the data, storing the data in memory, and generating reports from the data. The sensor 150 may be adapted to sense at least one of leaks, pressure, stress, strain, temperature, flow rate, viscosity, salinity, moisture, etc.

Figure 4:
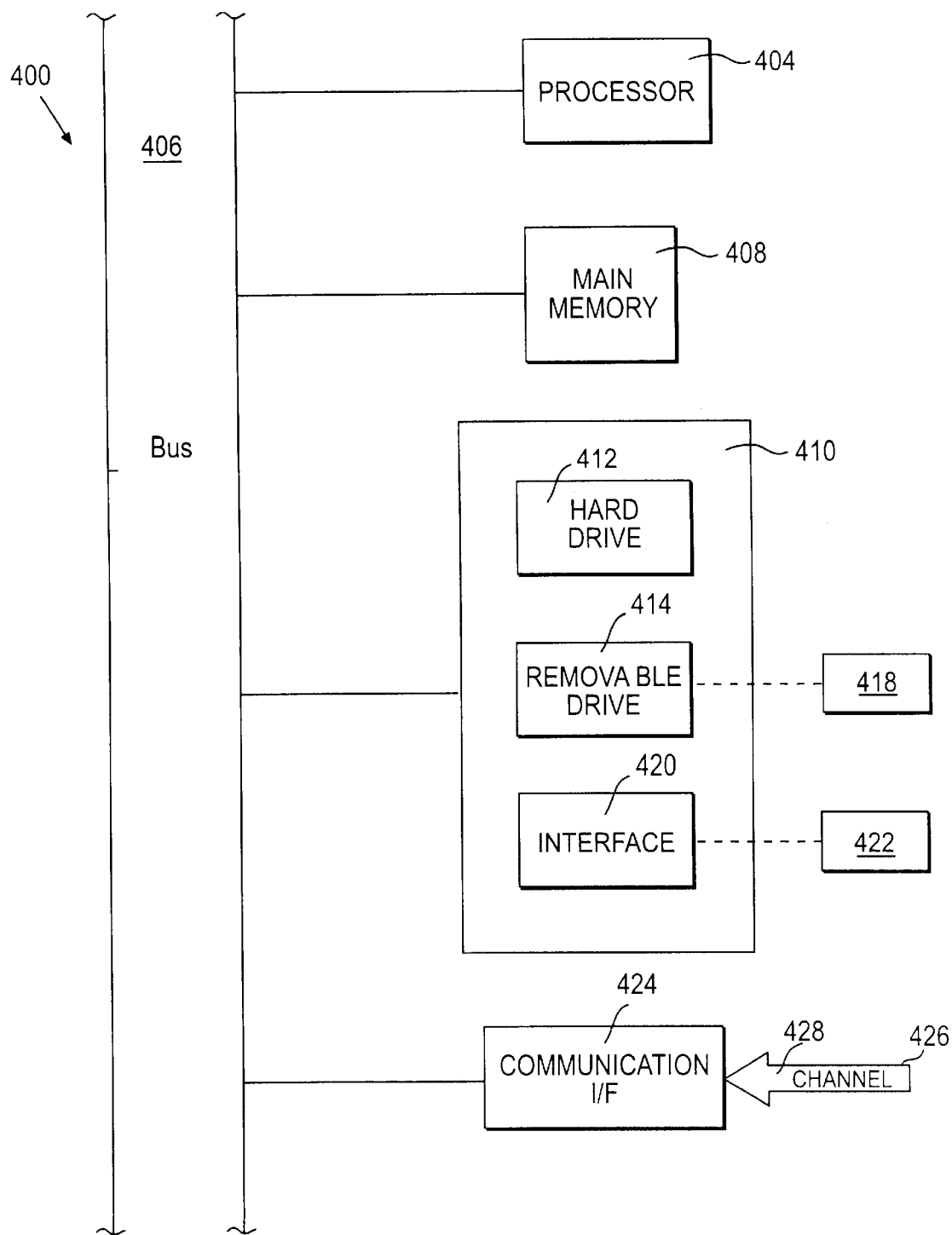
FIG. 4 shows an exemplary computer system suitable for use with the present invention.

A computer system capable of carrying out the functionality described herein is shown in more detail in FIG. 4. Computer system 400 includes one or more processors, such as processor 404. Processor 404 is connected to a communication bus 406. Various software embodiments are described in terms of this exemplary computer system. After reading this description, it will become apparent to a person skilled in the relevant art how to implement the invention using other computer systems and/or computer architectures.

Computer system 400 also includes a main memory 408, preferably random access memory (RAM), and may also include a secondary memory 410. Main memory may include dynamic random access memory (DRAM), synchronous DRAM (SDRAM), Rambusm™ memory, Flash ROM, Electrically Erasable Programmable Read-Only Memory (EEPROM), Erasable Programmable Read-Only Memory (EPROM), and Programmable Read-Only Memory (PROM). Secondary memory 410 may include, for example, a hard disk drive 412 and/or a removable storage drive 414, representing a floppy disk drive, a magnetic tape drive, an optical disk drive, etc. Removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCM-CIA slot and card, etc. Software and data transferred via communications interface 424 are in the form of signals 426 that may be electronic, electromagnetic, optical or other signals capable of being received by communications interface 424. Signals 426 are provided to communications interface via a channel 428. Channel 428 carries signals 426 and may be implemented using wire or cable, fiber optics, a phone line, a cellular phone link, an RF link and other communications channels.

In this document, the terms "computer program medium" and "computer usable medium" are used to generally refer to media such as removable storage device 418, a hard disk installed in hard disk drive 412, and signals 426. These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to perform the features of the present invention as discussed herein. In particular, the computer programs, when executed, enable processor 404 to perform the features of the present invention. Accordingly, such computer programs represent controllers of computer system 400.

In an embodiment where the invention is implemented using software, the software may be stored in a computer program product and loaded into computer system 400 using removable storage drive 414, hard drive 412 or communications interface 424. The control logic (software), when executed by processor 404, causes processor 404 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

As described above, the present invention provides a double walled apparatus 100 and method of manufacturing the same as well as a system and method for monitoring conditions within the apparatus 100.

CONCLUSION

While various embodiments of the present invention have been described above, it should be understood that they have been presented by way of example only, and not limitation. Thus, breadth and scope of the present invention should not be limited by any of the above-decribed exemplary embodiments, but should be defined only in accordance with the following claims and their equivalents.

I claim:

1. An apparatus, comprising:
   a first wall, wherein the first wall is designed to contain a liquid or a gas;
   a second wall, wherein the second wall is designed to contain any liquid or gas that penetrates the first wall; and
   interwoven fibers coupled between the first and second wall, creating a matrix defining a plurality of channels, wherein the plurality of channels allows for continuous flow of the liquid or gas.

2. The apparatus of claim 1, wherein the fibers are laminated with resin.

3. The apparatus of claim 1, further comprising a sensor embedded in the apparatus.

4. The apparatus of claim 1, further comprising a wire embedded in the apparatus.

5. The apparatus of claim 4, further comprising a sensor coupled to said wire.

6. The apparatus of claim 4, wherein said wire is a fiber optic cable.

7. The apparatus of claim 1, further comprising a wire disposed between the first and second wall.

8. The apparatus of claim 1, further comprising a wire disposed within the first wall.

9. The apparatus of claim 1, further comprising a wire disposed within the second wall.

10. The apparatus of claim 1, wherein said first wall comprises:
    a first layer comprising resin, and veil;
    a second layer coupled to the first layer, the second layer comprising a plurality of layers of chopped strand fiber mat, and resin; and
    a third layer coupled to the second layer, the third layer comprising chopped strand fiber mat, fiber, and resin.

11. The apparatus of claim 10, wherein the fiber in the third layer is woven roving fiber.

12. The apparatus of claim 10, wherein the fiber in the third layer is a filament wound continuous fiber.

13. A network of apparatuses, comprising:
    a double walled apparatus comprising
       a first wall, wherein the first wall is designed to contain a liquid or a gas;
       a second wall, wherein the second wall is designed to contain a liquid or gas that penetrates the first wall; and
       interwoven fibers coupled between the first and second wall, creating a matrix defining a plurality of channels, wherein the plurality of channels allows for continuous flow of the liquid or gas, and
    a connector, wherein the connector connects the double walled apparatus to another device designed to contain liquid or gas.

14. The network of claim 13, wherein the fibers of an apparatus are laminated with resin.

15. The network of claim 13, further comprising a sensor embedded in the apparatus.

16. The network of claim 13, further comprising a wire coupled to each apparatus.

17. The network of claim 16, further comprising a sensor coupled to said wire.

18. The network of claim 16, wherein said wire is a fiber optic cable.

19. The network of claim 13, further comprising a wire disposed between the first and second wall of each apparatus.

20. The network of claim 13, further comprising a wire disposed within the first wall of each apparatus.

21. The network of claim 13, further comprising a wire disposed within the second wall of each apparatus.

22. The network of claim 13, wherein the first wall of each apparatus comprises:
    a first layer comprising resin, and veil;

a second layer coupled to the first layer, the second layer comprising a plurality of layers of chopped strand fiber mat, and resin; and a third layer coupled to the second layer, the third layer comprising chopped strand fiber mat, fiber, and resin.

23. The network of claim 22, wherein the fiber in the third layer is woven roving fiber.

24. The network of claim 22, wherein the fiber in the third layer is a filament wound continuous fiber.

25. The network of claim 13, further comprising:

a receiver in electronic communication with said cable configured to receive data from said sensors.

* * * * *